Patented Feb. 16, 1932

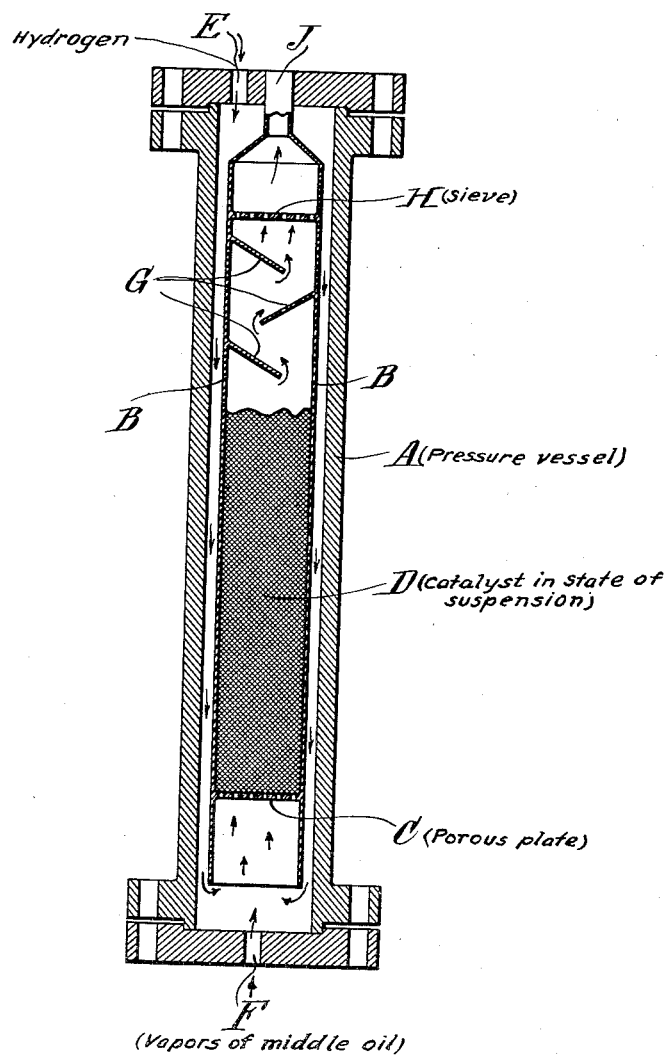

1,845,058

UNITED STATES PATENT OFFICE

MATHIAS PIER, OF HEIDELBERG, GERMANY, ASSIGNOR, BY MESNE ASSIGNMENTS, TO STANDARD-I. G. COMPANY, OF LINDEN, NEW JERSEY, A CORPORATION OF DELAWARE

CATALYTIC GAS REACTIONS

Application filed July 23, 1927, Serial No. 208,065, and in Germany July 24, 1926.

In the destructive hydrogenation of carbonaceous materials, such as coal, tars, mineral oils and the like, i. e. the treatment thereof with hydrogen under pressure, the highest catalytic effect possible is always aimed at. In the first place this, of course, depends on the quality of the catalyst employed, but also on the fact that as much as possible of the substances, which are to enter into reaction, should come into contact with the catalyst in the unit of time. An increase in the rate of the speed of the gases however shortens the duration of contact.

I have now found that the efficiency of the catalytic action is considerably increased by maintaining the catalyst in a more or less fine state of division, into a state of suspension in the reaction chamber, the particles of the catalyst being whirled about therein by means of an eddying gas current. The strength of the said gas current is so adjusted that the bulk of the catalyst remains within the reaction space and is not carried away therefrom by the reaction gases. The said gas current may be a component in the reaction or an inert gas, and it may be introduced into the reaction space through a grate or nozzles, but it is also very advantageous to pass the same through porous plates or through a layer of granular material, preferably in such a manner that the gas traverses all parts of the cross-section at approximately the same rate, a uniform distribution of the gas current being thus obtained which ensures the whirling particles of the contact substance to be present in every part of the reaction space. In this way, it is achieved that the largest possible amount of the substances, which are to enter into reaction, comes into contact with a given amount of the catalyst and is catalytically influenced thereby.

With the rate of the gas current, the specific density of the gas, the size of the particles of the catalyst and its specific gravity suitably adapted to one another, the height of the reaction sphere can be kept constant. The catalysts which are thus whirled up, may be of granular nature consisting of coarse or fine grains, or they may be employed in a finely divided state. They may even be employed in the finest degree of dispersion, so that substances come into question as catalysts, which otherwise do not act catalytically.

The process according to the present invention has the further advantage that the distribution of heat is effected very rapidly and thoroughly, so that both in exothermic and endothermic reactions, a uniform temperature throughout the reacting space is easily maintained.

Any dust evolved from the catalyst is removed from the reaction gases before they reach the cooler parts of the apparatus, where otherwise condensations or undesirable reactions and the like might take place. The said removal of catalyst dust may be effected by suitable devices, such for example as baffles, sieves and screens, electric dust precipitators and the like.

An apparatus suitable for carrying out my invention is shown in cross-section in the accompanying diagrammatical drawing. Into the tube-shaped pressure-vessel A an inner vessel B is inserted which is provided near its lower end with a porous plate C. The catalyst in the form of powder or fine grains is maintained in a state of whirling motion as indicated by the shading D. The apparatus is operated as follows; reference being had for example to the destructive hydrogenation of a heavy middle oil. Hydrogen is fed in at E and passes down along the wall of the vessel A until near the bottom thereof where it is mixed with vapors of the middle oil introduced at F. The resulting gas and vapor mixture is passed through the porous plate C into the catalyst resting thereon which is whirled up by the gas current and thus brought into intimate contact therewith. The fine catalyst particles are separated from the gas having undergone the treatment by means of the baffles G and the sieve H. The gas leaves the apparatus at J.

The following example will further illustrate how my invention may be carried out in practice but the invention is not limited to this example.

Example

A current of hydrogen charged with the vapors of a heavy middle oil is passed into a high pressure reaction vessel from below, at 460° C. and 200 atmospheres pressure, through a porous plate of fire-proof material, extending over the whole cross-section of the said vessel and tightly fixed therein, and on which a molybdenum-chromium catalyst rests in a granular state or in the form of dust. At a proper speed of the oil-loaded gas current, the catalyst is brought into suspension in the reaction space, the particles whirling about and being fairly uniformly distributed throughout the whole of the reaction space. Before the reaction product reaches the cooler parts of the apparatus, the catalyst dust is removed from the gas current by means of baffles or a dust separator consisting of a wire screen with very fine meshes.

On cooling the gases leaving the reaction vessel a product is obtained containing more than 70 per cent of benzine.

Because of the whirling movements of the catalyst, its efficiency is far greater than without the employment of the whirling catalysts, under otherwise similar conditions of working.

What I claim is:

A process for the catalytic destructive hydrogenation of mineral oils with hydrogen at an elevated temperature and pressure which comprises maintaining catalyst particles in a state of suspension and eddying motion within the reaction space by means of hydrogen charged with the vapors of the said mineral oil and blown in at sufficient speed to effect such suspension but not at such a high speed as to carry away the bulk of the catalyst from the reaction space and removing any catalyst particles which may be carried along from the reaction gas before condensation takes place by contact with cooler parts of the apparatus.

In testimony whereof I have hereunto set my hand.

MATHIAS PIER.

CERTIFICATE OF CORRECTION.

Patent No. 1,845,058.                                        February 16, 1932.

MATHIAS PIER.

It is hereby certified that error appears in the printed specification of the above numbered patent requiring correction as follows: Page 1, line 87, after "F." insert the words "During its passage along the wall of the vessel A the hydrogen is preheated by the heat of the chamber B, thereby cooling the upper part of this chamber."; and that the said Letters Patent should be read with this correction therein that the same may conform to the record of the case in the Patent Office.

Signed and sealed this 13th day of December, A. D. 1932.

(Seal)
M. J. Moore,
Acting Commissioner of Patents.